July 15, 1924.

A. M. CHASE

ENDLESS TRACK FOR TRACTORS

Filed Jan. 13, 1921

1,501,097

Amin M. Chase,
INVENTOR.

BY
Parsons Brodell
ATTORNEYS.

Patented July 15, 1924.

1,501,097

UNITED STATES PATENT OFFICE.

AURIN M. CHASE, OF SYRACUSE, NEW YORK.

ENDLESS TRACK FOR TRACTORS.

Application filed January 13, 1921. Serial No. 437,038.

*To all whom it may concern:*

Be it known that I, AURIN M. CHASE, a citizen of the United States, and a resident of Syracuse, in the county of Onondaga and State of New York, having invented a certain new and useful Endless Track for Tractors, of which the following is a specification.

This invention relates to a track or belt for use on power driven tractor machines, artillery, trailers, etc., and has for its object a belt construction by which the wheels about which the belt runs, have traction on the ground and further by which dirt and other matter cannot accumulate on the belt and between the wheels and the belt, so that the belt is self cleaning. A further object is a belt having no hinged or jointed links or sections. Other objects will appear throughout the specification.

The invention consists in the novel features and in the combinations and constructions hereinafter set forth and claimed.

In describing this invention, reference is had to the accompanying drawings in which like characters designate corresponding parts in all the views.

Figure 2:
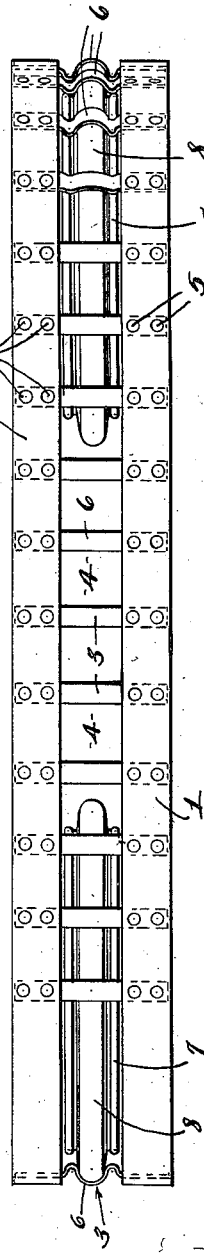
Figure 2 is a plan view of parts seen in Fig. 1.

This tractor belt comprises generally, a continuous belt element formed of flexible material in contradistinction to a tractor belt composed of jointed or hinged sections, such belt element being also provided with openings along its median line through which dirt and other matter may pass and also through which the wheels about which the belt runs may have traction on the ground.

The tractor belt here illustrated comprises endless belts or webs spaced apart from each other and arranged to run on opposite sides of the treads of the wheels over which the belt runs and in planes tangent or nearly tangent to the tread surfaces of the wheels whereby the belts engage the traction surface, and supporting means for the belts arranged to extend across the treads of the wheels, such supporting means being spaced apart lengthwise of the belts whereby the treads of the wheels run on the track between the belts, which also engage the traction surface.

In the illustrated embodiment of my invention, the belt element is composed of two spaced apart parallel units 1, 2 and transverse cross members or cleats 3 which form openings 4 along the median line of the belt element. The units 1, 2 are composed of any suitable flexible material, as fibre or fibre and rubber vulcanized together, or any other strong, tough and flexible material.

The cross members 3 have end portions which are secured by riveting or otherwise as at 5 to the belt units 1, 2, and the intermediate portions 6 thereof are shaped to conform to, or receive the peripheries of the wheels 7 about which the tractor belt runs. As here shown, these intermediate portions 6 are in the form of channels for receiving the tires 8 of such wheel.

Figure 1:
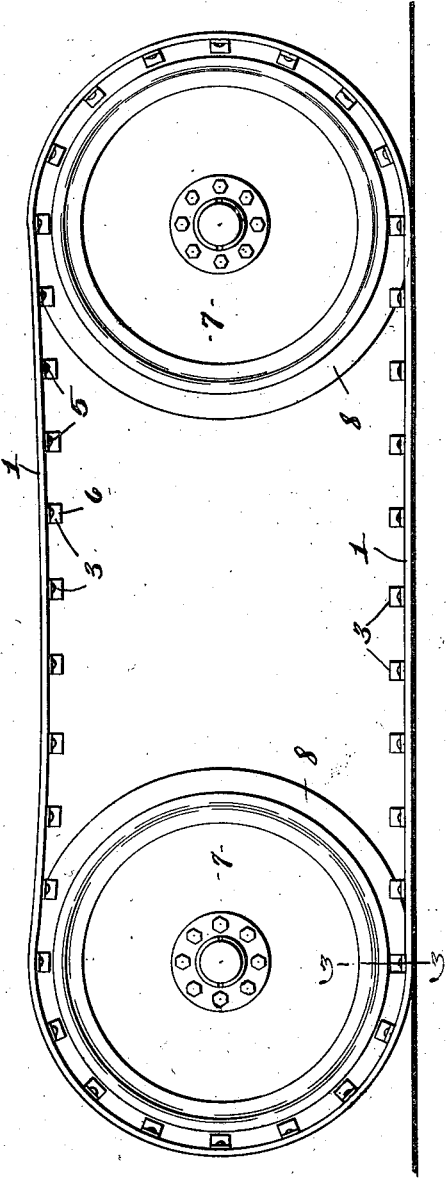
Figure 1 is an elevation of one form of this belt construction.
Figure 3:
Figure 3 is a cross sectional view taken on line 3—3, Fig. 1.
Figure 4:
Figure 4 is a cross sectional view similar to Fig. 3, of a modified form of this belt.

As seen in Fig. 4, the end portions of the cleats may lie on the outer face of the belt, that is, the face running on the ground, instead of the inner face as shown in Figs. 1, 2 and 3.

Furthermore, owing to the formation of the belt from continuous units 1, and 2, there are no joints to clog and owing to the openings 4, the dirt that may accumulate on the belt either passes off through the openings 4 or falls off when it is carried by the belt upwardly around the wheels to the top run of the belt. Any dirt thus accumulating cannot get between the belt and the wheels, as the wheels or the tires thereof, are exposed through the openings 4 and the belt units 2 do not run over the peripheries of the wheels. This feature is particularly advantageous when the tractor is turning, as the belts then scoop up the dirt during sidewise turning movements.

In operation, owing to the flexibility of the track, a comparatively high speed can be obtained, not possible in tractors in which the tracks or belts are composed of hinged or jointed units, and in which the belt has no openings large enough to permit the belt or track to clear itself.

Furthermore, in some instances, as in the case of artillery, when running over a fairly good road, the tracks can be removed and a comparatively high speed, say twenty miles and hour can be maintained, and when it is necessary to run off the road and over rough ground, the track can be quickly applied. During turning on the rough ground where ordinarily the tracks scoop up large quantities of earth which are carried between the wheels and the tracks and oftentimes cause the tracks to come off the wheels, my track clears itself as the dirt, mud etc. either passes through the openings 4, or is carried along the lower run of the belt and falls off when the portion on which the earth is accumulated runs up around the wheel.

What I claim is:

A track or belt comprising endless flexible belts or webs spaced apart from each other and arranged to run on opposite sides of the treads of the wheels over which the belt runs and in planes approximately tangent to the treads of such wheels, whereby the belts engage the traction surface, and supporting means for the belts arranged to extend crosswise of the treads of the wheels, such supporting means being spaced apart lengthwise of the belts.

In testimony whereof, I have hereunto signed my name at Syracuse, in the county of Onondaga, and State of New York, this 7th day of January, 1921.

AURIN M. CHASE.